(12) United States Patent
Carpenter et al.

(10) Patent No.: US 12,462,859 B2
(45) Date of Patent: Nov. 4, 2025

(54) FREE-LAYER DESIGN FOR A VOLTAGE CONTROL OF MAGNETIC ANISOTROPY MAGNETIC RANDOM ACCESS MEMORY DEVICE

(71) Applicant: IMEC VZW, Leuven (BE)

(72) Inventors: Robert Carpenter, Kessel-lo (BE); Woojim Kim, Watermael-Boitsfort (BE); Kiroubanand Sankaran, Herent (BE)

(73) Assignee: Imec VZW, Leuven (BE)

( * ) Notice: Subject to any disclaimer, the term of this patent is extended or adjusted under 35 U.S.C. 154(b) by 467 days.

(21) Appl. No.: 18/062,785

(22) Filed: Dec. 7, 2022

(65) Prior Publication Data

US 2023/0178131 A1  Jun. 8, 2023

(30) Foreign Application Priority Data

Dec. 8, 2021 (EP) .................................. 21213085

(51) Int. Cl.
*G11C 11/16* (2006.01)
*H01F 10/32* (2006.01)
*H10B 61/00* (2023.01)
*H10N 50/10* (2023.01)
*H10N 50/85* (2023.01)

(52) U.S. Cl.
CPC ........ *G11C 11/161* (2013.01); *H01F 10/3286* (2013.01); *H10B 61/00* (2023.02); *H10N 50/10* (2023.02); *H10N 50/85* (2023.02)

(58) Field of Classification Search
CPC ...... H01F 10/3286; H10B 61/00; H10N 50/85
See application file for complete search history.

(56) References Cited

U.S. PATENT DOCUMENTS

| | | | |
|---|---|---|---|
| 9,324,403 | B2 | 4/2016 | Khalili Amiri et al. |
| 9,680,089 | B1 | 6/2017 | Chen et al. |
| 2014/0177327 | A1 | 6/2014 | Khalili Amiri et al. |
| 2016/0232959 | A1 | 8/2016 | Lee et al. |
| 2016/0240771 | A1 | 8/2016 | Hu |

(Continued)

OTHER PUBLICATIONS

Baek, Jong-Ung, Sun-Hwa Jung, Han-Sol Jun, Kei Ashiba, Jin-Young Choi, and Jea-Gun Park. "Enhanced Thermal Stability in Magnetic Random-Access Memory Cells With Free Layer Composed of Multilayer Co/Pt Coupled to Co 2 Fe 6 B 2 With Interfacial Perpendicular Magnetic Anisotropy." IEEE Magnetics Letters 10 (2019): 1-5.

(Continued)

*Primary Examiner* — Christine S. Kim
*Assistant Examiner* — Andrew Victor Prostor
(74) *Attorney, Agent, or Firm* — McDonnell Boehnen Hulbert & Berghoff LLP (57) ABSTRACT

The present disclosure provides improved VCMA MRAM devices that include an engineered magnetic structure. The disclosure also presents the engineered magnetic structure, which includes a magnetic reference layer, a tunnel barrier layer provided on the magnetic reference layer, an interface layer provided on the tunnel barrier layer, a magnetic free layer provided on the interface layer, and a cap layer provided on the magnetic free layer. The interface layer and the cap layer are engineered to enhance an orbital occupancy and/or a spin-orbit-coupling of the magnetic free layer.

19 Claims, 7 Drawing Sheets

(56) References Cited

U.S. PATENT DOCUMENTS

| | | | |
|---|---|---|---|
| 2019/0051818 A1 | 2/2019 | Oikawa et al. | |
| 2019/0189908 A1 | 6/2019 | Ebrahimi et al. | |
| 2020/0052192 A1* | 2/2020 | Ma | H10N 50/80 |
| 2021/0210676 A1 | 7/2021 | Prasad | |
| 2022/0109100 A1* | 4/2022 | Lee | H10N 50/80 |
| 2022/0392505 A1* | 12/2022 | Stewart | H10B 61/00 |

OTHER PUBLICATIONS

Grezes, Cecile, Xiang Li, Kin L. Wong, Farbod Ebrahimi, Pedram Khalili Amiri, and Kang L. Wang. "Voltage-controlled magnetic tunnel junctions with synthetic ferromagnet free layer sandwiched by asymmetric double MgO barriers." Journal of Physics D: Applied Physics 53, No. 1 (2019): 014006.

Couet, Sebastien, Johan Swerts, Sofie Mertens, Tsann Lin, Yoann Tomczak, Enlong Liu, Bastien Douhard, Sven Van Elshocht, Arnaud Furnemont, and Gouri Sankar Kar. "Oxygen scavenging by Ta spacers in double—MgO free layers for perpendicular spin-transfer torque magnetic random-access memory." IEEE Magnetics Letters 7 (2016): 1-4.

Yamamoto, Tatsuya, Takayuki Nozaki, Kay Yakushiji, Shingo Tamaru, Hitoshi Kubota, Akio Fukushima, and Shinji Yuasa. "Perpendicular magnetic anisotropy and its voltage control in MgO/CoFeB/MgO junctions with atomically thin Ta adhesion layers." Acta Materialia 216 (2021): 117097.

Mertens, Sofie, Sebastien Couet, Robert Carpenter, Johan Swerts, Davide Crotti, and G. Sankar Kar. "MgGa2O4 as alternative barrier for perpendicular MRAM junctions and VCMA." Applied Physics Letters 118, No. 17 (2021): 172402.

Li, Xiang. Interface Engineering of Voltage-Controlled Embedded Magnetic Random Access Memoryv. University of California, Los Angeles, 2018.

Extended European Search Report and Written Opinion, Application No. 21213085.0, mailed Jun. 20, 2022, 8 pages.

Nozaki, Takayuki, Masaki Endo, Masahito Tsujikawa, Tatsuya Yamamoto, Tomohiro Nozaki, Makoto Konoto, Hiroyuki Ohmori et al. "Voltage-controlled magnetic anisotropy in an ultrathin Ir—doped Fe layer with a CoFe termination layer." APL Materials 8, No. 1 (2020): 011108.

Su, Yurong, Jia Zhang, Jeongmin Hong, and Long You. "The effect of insertion layer on the perpendicular magnetic anisotropy and its electric-field-induced change at Fe/MgO interface: a first-principles investigation." Journal of Physics: Condensed Matter 32, No. 45 (2020): 454001.

* cited by examiner

FREE-LAYER DESIGN FOR A VOLTAGE CONTROL OF MAGNETIC ANISOTROPY MAGNETIC RANDOM ACCESS MEMORY DEVICE

CROSS-REFERENCE TO RELATED APPLICATIONS

The present application is a non-provisional patent application claiming priority to European Patent Application No. EP 21213085.0, filed Dec. 8, 2021, the contents of which are hereby incorporated by reference.

TECHNICAL FIELD

The present disclosure relates to Voltage Control of Magnetic Anisotropy (VCMA) Magnetic Random Access Memory (MRAM) devices. The disclosure provides examples of such VCMA MRAM devices that include an engineered magnetic structure. The disclosure also provides examples of such magnetic structures that include a magnetic free layer, an engineered interface layer on the free layer, and an engineered cap layer on the free layer on the opposite side of the interface layer.

BACKGROUND

VCMA MRAM devices store information in a magnetic layer that may be referred to as the magnetic free layer. For performing a write of information into this free layer, a voltage is applied across a barrier layer, for example, a magnesium oxide (MgO) layer, in order to change the orientation of the magnetization of the free layer. The write efficiency is dictated by the VCMA coefficient $\xi$ (fJ/Vm). The control of this VCMA coefficient is a technical challenge.

For performing a read operation, another magnetic layer called the magnetic reference layer is employed. For example, the tunneling magnetoresistance (TMR) of tunneling through the barrier layer (thus also called the tunnel barrier layer) between the reference layer and the free layer may be measured to read information from the free layer. The TMR is indicative of the fixed magnetization of the reference layer being either parallel ("0") or anti-parallel ("1") to the magnetization of the free layer. Typically, the reference layer is made of cobalt-iron-boron (CoFeB), which may be used to improve the TMR ratio of the VCMA MRAM device.

SUMMARY

For a practical application of the VCMA effect as a write mechanism, the VCMA effect should have a large size. For many practical applications the VCMA coefficient should be on the order of 100 fJ/Vm. For some specific applications, the VCMA coefficient should ideally even be larger. For example, when using VCMA as a gate/selector for a spin orbit torque (SOT) write mechanism, the VCMA coefficient should be as high as 300 fJ/Vm. In another example, for a fully VCMA-written device the VCMA coefficient should ideally be as high as 1000 fJ/Vm.

Technological approaches that are able provide large VCMA coefficients include epitaxial, partial stacks, or alternative mechanisms. Such approaches are generally not industrially friendly or do not represent 'real' devices. VCMA coefficients reached in 'real' devices (let alone in fully integrated arrays of such devices) exhibit VCMA coefficients significantly lower than 100 fJ/Vm.

Figure 1:
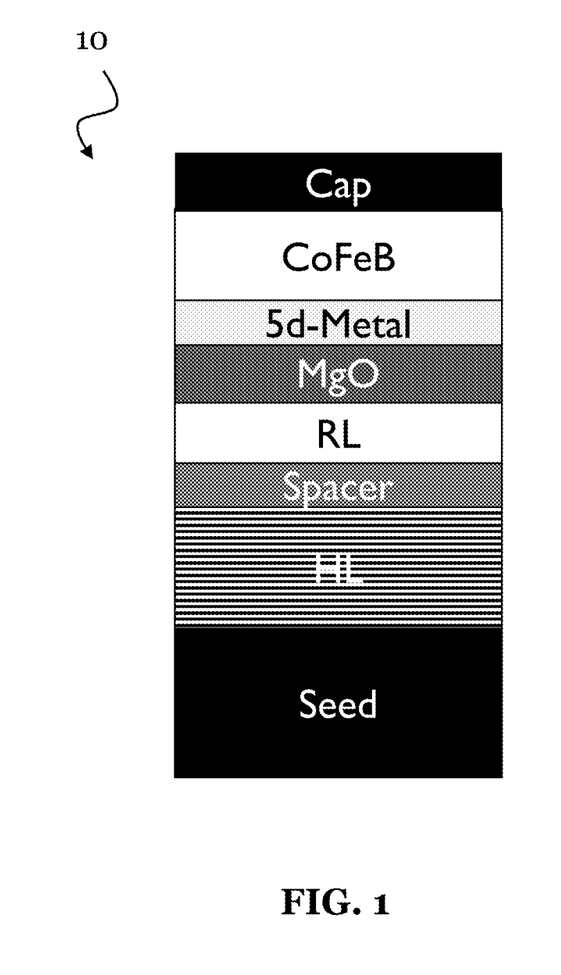
FIG. 1 shows a VCMA MRAM device, according to an example embodiment.

Large VCMA coefficients can be obtained in a 'real' device by using the approach of employing sputtered films. In particular, as shown in FIG. 1 for an exemplary VCMA MRAM device 10, a thin transition metal (TM) film, such as a 5d transition-metal film made of iridium (Ir), may be used as an interface layer arranged between an MgO tunnel barrier layer and a magnetic CoFeB free layer. This approach is beneficial for increasing the positive magnetoanisotropy energy (MAE), e.g., the perpendicular magneto anisotropy (PMA). However, as a drawback of this approach, the coercive field (Hc) of the free layer is low, due to the presence of the Ir at the interface of the free layer. The Hc is the magnetic field that the magnetization of the free layer is able to withstand without becoming demagnetized or even being switched. The reason for the reduced Hc is that the Ir acts as an anti-crystallization barrier, which prevents crystallization from transferring from the MgO layer to the free layer. The low Hc limits the retention of the exemplary VCMA MRAM device 10.

Additionally, the nature of the TM film induces a change of the electrostatic potential of the VCMA MRAM device stack. Subsequently, a change in the band offset (effective work function of the metals) occurs. The band offset, however, is important to induce an electric field change at the interface, in order to switch the magnetization of the free layer. The band offset that occurs as a consequence of the TM film may thus negatively affect the switching of the magnetization of the free layer by activating more d-orbitals contribution to the negative MAE.

This disclosure provides new magnetic structures for a VCMA MRAM device, wherein the magnetic structure includes a magnetic free layer and allows the VCMA coefficient $\xi$ to be increased to the order of 100 fJ/Vm or even greater. At the same time, embodiments described herein achieve a high coercive field in the free layer, in particular, so that the VCMA MRAM has sufficient retention. Such embodiments as are described herein also allow the magnetization of the free layer to be switched efficiently.

The embodiments provided in this disclosure are based on a magnetic structure including an engineered interface layer, which is provided on the magnetic free layer on one side, and further including an engineered cap layer, which is provided on the free layer on the other side opposite to the engineered interface layer.

A first aspect of this disclosure provides a magnetic structure for a VCMA MRAM device, the magnetic structure comprising: a magnetic reference layer; a tunnel barrier layer provided directly on the magnetic reference layer; an interface layer provided directly on the tunnel barrier layer; a magnetic free layer provided directly on the interface layer; and a cap layer provided directly on the magnetic free layer; wherein the interface layer and the cap layer are designed to enhance or control an orbital occupancy and/or a spin-orbit coupling of the magnetic free layer.

The orbital occupancy of the magnetic free layer denotes the electron occupancy of the orbitals of the magnetic free layer material. Spin-orbit-coupling is a well-known physical effect and/or material property. The spin-orbit-coupling of the magnetic free layer accordingly is a material property of the material of the magnetic free layer. An enhanced or controlled orbital occupancy and/or spin-orbit-coupling may be an increased orbital occupancy and/or a stronger spin-orbit-coupling, and may lead to a higher PMA, and may further lead to a larger VCMA coefficient. Thus, the control or enhancement of the orbital occupancy and/or of the spin-orbit-coupling of the magnetic free layer, by engineering (e.g., selecting material composition and thickness of) the interface layer and the cap layer, respectively, leads to an increase of the VCMA coefficient of the magnetic structure. For example, the magnetic structure may have a VCMA coefficient of 100 fJ/Vm or even larger. The orbital occupancy and/or the spin-orbit-coupling of the free layer of the magnetic structure can thus be controlled or enhanced relative to structures that lack or that include alternatively configured interface layer and/or cap layer, for example, when using an Ir layer as the interface layer and a conventional metal layer (e.g., tantalum layer) as the cap layer (as it is in the example VCMA MRAM device 10 shown in FIG. 2).

In an implementation of the magnetic structure, the interface layer is designed also to enhance a crystallinity of the magnetic free layer; and/or the cap layer is also designed to terminate a composition of the magnetic free layer.

Figure 2:
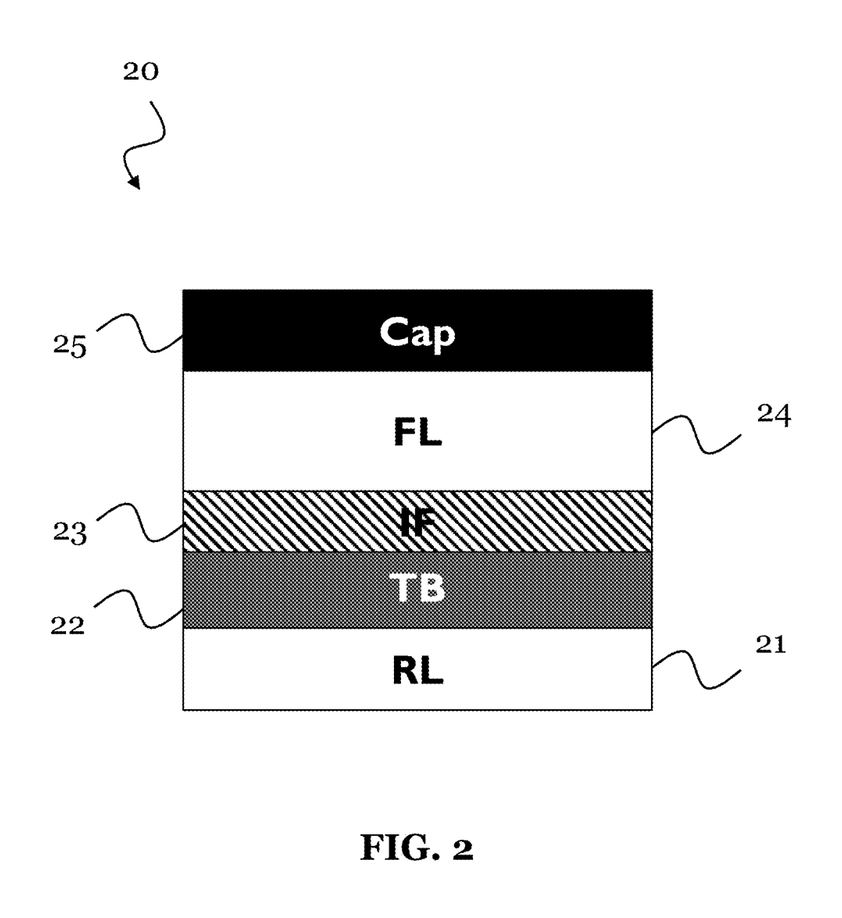
FIG. 2 shows a magnetic structure for a VCMA MRAM device, according to an example embodiment.

The interface layer is also designed to improve a crystallization of the magnetic free layer, e.g., the magnetic free layer has a better crystallization than without the engineered interface layer, or than with an interface layer made from Ir, as in the exemplary VCMA MRAM device 10 shown in FIG. 2. The interface layer of a magnetic structure according to the first aspect can also be designed to control a termination composition of the magnetic free layer, leading to the higher crystallinity of the magnetic free layer.

In an example implementation of the magnetic structure, the cap layer comprises at least one 4f-metal layer and/or 5d-metal layer configured to enhance or control the orbital occupancy and/or the spin-orbit coupling of the magnetic free layer; and/or the interface layer comprises at least one 4f-metal layer and/or 5d-metal layer configured to enhance or control the orbital occupancy and/or the spin-orbit coupling of the magnetic free layer.

The cap layer material can be selected to increase the crystallization of the magnetic free layer, while it may at the same time also enhance or control the orbital occupancy and/or the spin-orbit coupling.

In an example implementation of the magnetic structure, the interface layer comprises at least one oxide layer configured to enhance the crystallinity of the magnetic free layer; and/or the interface layer comprises a dusting layer made of at least one material, which is also included in the magnetic free layer and is configured to terminate the composition of the magnetic free layer.

The interface layer material can be specified to improve not only the crystallization of the magnetic free layer but may also to modify the band offset between free layer and tunnel barrier, and may improve the controllability of the orbital occupancy and/or of the spin-orbit coupling of the free layer. As a result, a large VCMA coefficient is achieved.

In an example implementation of the magnetic structure, the cap layer comprises at least one of an oxide layer or a metal layer; the oxide layer comprises at least one of magnesium oxide, magnesium aluminum oxide, or magnesium titanium oxide; and/or the metal layer comprises at least one of iridium, platinum, vanadium, scandium, osmium, gadolinium, terbium, or ytterbium.

Such a cap layer can be designed to enhance the orbital occupancy and/or the spin-orbit coupling of the magnetic free layer.

In an example implementation of the magnetic structure, the interface layer comprises at least one of an iron layer, a cobalt layer, an iridium layer, a platinum layer, a vanadium layer, a scandium layer, an osmium layer, a gadolinium layer, a terbium layer, or an ytterbium layer.

Such an interface layer can be designed to enhance or control the orbital occupancy and/or the spin-orbit coupling of the magnetic free layer.

An example aspect of this disclosure provides a magnetic structure for a VCMA MRAM device, the magnetic structure comprising: a magnetic reference layer; a tunnel barrier layer provided directly on the magnetic reference layer; an interface layer provided directly on the tunnel barrier layer; a magnetic free layer provided directly on the interface layer; and a cap layer provided directly on the magnetic free layer; wherein the cap layer comprises at least one of an oxide layer or a metal layer; wherein the oxide layer comprises at least one of magnesium oxide, magnesium aluminum oxide, or magnesium titanium oxide; wherein the metal layer comprises at least one of iridium, platinum, gadolinium, terbium, vanadium, scandium, osmium, or ytterbium; and wherein the interface layer comprises at least one of an iron layer, a cobalt layer, an iridium layer, a platinum layer, an osmium layer, a gadolinium layer, a terbium layer, a vanadium layer, a scandium layer, or an ytterbium layer In an example implementation of the magnetic structure, the magnetic free layer is doped with a 4f-metal.

This may further increase the VCMA coefficient, since it may further enhance the orbital occupancy and/or the spin-orbit coupling of the free layer.

In an example implementation of the magnetic structure, the magnetic free layer comprises at least one of cobalt-iron-boron or iron-boron, and is doped with at least one of gadolinium, terbium, or ytterbium.

Such a magnetic free layer can lead to a particularly large VCMA coefficient.

In an example implementation of the magnetic structure, the interface layer has a thickness in a range of 0.1-3 Angstrom; and/or the cap layer has a thickness in a range of 1-5 Angstrom; and/or the magnetic free layer has a thickness in a range of 5-10 Angstrom.

These layer thicknesses can lead to a particularly large VCMA coefficient.

In an example implementation of the magnetic structure, the interface layer includes an iridium layer provided directly on the tunnel barrier layer, and an iron layer provided directly on the iridium layer.

In an example implementation of the magnetic structure, the iron layer has a thickness of about 2.5 Angstrom and the iridium layer has a thickness of about 0.5 Angstrom.

The above example implementations provide examples of an interface layer, with which VCMA coefficients of above 100 fJ/Vm can be achieved.

In an example implementation of the magnetic structure, the magnetic free layer includes one of the following: a cobalt-iron-boron layer provided directly on the interface layer; a gadolinium layer provided directly on the interface layer, and a cobalt-iron-boron layer provided directly on the gadolinium layer; a cobalt-iron-boron layer provided directly on the interface layer, a gadolinium layer provided directly on the cobalt-iron-boron layer, and another cobalt-iron-boron layer provided directly on the gadolinium layer.

In an example implementation of the magnetic structure, the cobalt-iron-boron layer of the magnetic free layer is provided directly on the iron layer of the interface layer.

The above example implementations provide examples of a magnetic free layer, with which VCMA coefficients of above 100 fJNm can be achieved.

A second aspect of this disclosure provides a VCMA MRAM device comprising the magnetic structure according to the first aspect or any implementation form thereof.

In an example implementation of the VCMA MRAM device, the VCMA MRAM device further comprises: a spacer layer provided directly on the reference layer on the opposite side of the tunnel barrier layer; a magnetic hard layer provided directly on the spacer layer on the opposite side of the reference layer; and a seed layer provided directly on the magnetic hard layer on the opposite side of the spacer layer.

By using the magnetic structure of the first aspect, the VCMA MRAM device of the second aspect shows a very large VCMA coefficient, for instance, around 100 fJ/Vm or even more.

The VCMA MRAM device of the second aspect provides similar benefits to the magnetic structure of the first aspect and may be extended by respective implementations as described above for the magnetic structure of the first aspect.

A third aspect of this disclosure provides a method for fabricating a magnetic structure according to the first aspect and/or a VCMA MRAM device according to the second aspect. The method includes steps of fabricating the respective layers of the magnetic structure and/or the VCMA MRAM device.

The method of the third aspect provides similar benefits to the magnetic structure of the first aspect and/or the VCMA MRAM device of the second aspect, and may be extended by respective implementations as described above for the magnetic structure of the first aspect.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments described herein are capable of operation in other orientations than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising A and B" should not be interpreted as being limited to devices consisting only of components A and B. It means that with respect to the present disclosure, the only relevant components of the device are A and B.

Where the term "about" is used to modify a strictly positive measure (e.g., a thickness, a distance, a temperature, a volume, a mass), this should be interpreted to encompass a range of measurements between 15% less than the measure (i.e., 85% of the measure) and 15% more than the measure (i.e., 115% of the measure), unless context dictates otherwise (e.g., if the text reads "a layer thickness of about 2.5 Angstroms (e.g., between 2.25 Angstroms and 3 Angstroms)," then the phrase "a layer thickness of about 2.5 Angstroms," in that context, should be interpreted to encompass layers having thicknesses in the range of 2.25 Angstroms to 3 Angstroms inclusive). So, for example, text reading "a distance of about 5 microns," absent context indicating the contrary, should be interpreted as distances between 4.25 microns and 5.75 microns.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed subject matter requires more features than are expressly recited in each claim. Rather, as the following claims reflect, various aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, understood methods, structures, and techniques have not been shown in detail in order not to obscure an understanding of this description.

FIG. 2 shows a magnetic structure 20 according to an example embodiment of this disclosure. The magnetic structure 20 can be used to design and build a VCMA MRAM device 30 (see e.g., FIG. 3), which shows a large VCMA coefficient, in particular, of at least 100 fJ/Vm or more.

The magnetic structure 20 comprises a magnetic reference layer 21, a magnetic tunnel barrier layer 22, an interface layer 23, a magnetic free layer 24, and a cap layer 25.

The magnetic reference layer 21 may be a cobalt-based layer or an iron-based layer. For example, the magnetic reference layer 21 may be a CoFeB layer. The magnetic reference layer may have a fixed polarization.

The tunnel barrier layer 22 is provided directly on the magnetic reference layer 21. Generally in this disclosure, a layer being "provided on" another layer means that this layer is "provided directly on" the other layer. In contrast thereto, a layer "provided above" another layer means that the layer is "provided indirectly on" the other layer, for example, with one or more additional layers arranged in between the layer and the other layer. The tunnel barrier layer 22 may be a dielectric layer or an oxide layer. For example, the tunnel barrier layer 22 may be an MgO layer.

The interface layer 23 is provided directly on the tunnel barrier layer 22. The interface layer 23 may comprise at least one of an iron (Fe) layer, a cobalt (Co) layer, an Ir layer, a platinum (Pt) layer, an osmium (Os) layer, a gadolinium (Gd) layer, a terbium (Tb) layer, a vanadium (V) layer, a scandium (Sc) layer, an osmium (Os) layer, or an ytterbium (Yt) layer. The interface layer 23 may be referred to as a specifically engineered interface layer, which enhances (increases) or controls an orbital occupancy and/or a spin-orbit-coupling of the magnetic free layer 24 (compared to the absence of such an interface layer or a thin interface layer composed of Ir). To this end, the interface layer 23 may comprise at least one 4f-metal layer (e.g., of Gd, Tb, and Yb) and/or at least one 5d-metal layer (e.g., Ir, Pt). Notably, an interface layer consisting only of an Ir layer would not enhance the orbital occupancy and/or the spin-orbit-coupling of the free layer 24, and thus the interface layer 23 cannot consist only of an Ir layer.

The interface layer 23 may be further designed to enhance a crystallinity of the magnetic free layer 24. To this end, the interface layer 23 may comprise at least one oxide layer and/or a dusting layer that is made of at least one material that is also included in the magnetic free layer 24 (e.g., a dusting layer of Co or Fe in case of a CoFeB free layer) and that is configured to terminate the composition of the magnetic free layer 24. As an example, the interface layer 23 may consist of an Ir layer and an iron (Fe) layer, wherein the Ir layer is provided on the tunnel barrier layer and the Fe layer is provided on the Ir layer.

The magnetic free layer 24 is provided directly on the interface layer 23. The magnetic free layer 24 may comprise at least one of a CoFeB or an iron-boron (FeB) layer, and may be doped with at least one of gadolinium, terbium, or ytterbium. For example, the free layer 24 may be doped with a 4f-metal. However, the free layer 24 may also be undoped. As examples, the free layer 24 may consist of a CoFeB layer, or may consist of a gadolinium (Gd) layer and a CoFeB layer on the Gd layer, or may consist of a Gd layer and two CoFeB layers that sandwich the Gd layer.

The cap layer 25 is provided directly on the magnetic free layer 24. The cap layer 25 may comprise at least one of an oxide layer or a metal layer. The oxide layer may comprise at least one of MgO, magnesium aluminum oxide ($MgAl_2O_3$), or magnesium titanium oxide (MgTiO). The metal layer may comprise at least one of Ir, Pt, Gd, Tb, or Yb. The cap layer 25 may be referred to as a specifically engineered interface layer, which enhances (increases) or controls the orbital occupancy and/or the spin-orbit-coupling of the magnetic free layer 24. To this end, the cap layer 25 may comprise at least one 4f-metal layer (e.g., Gd, Tb, Yb) and/or 5d-metal layer (e.g., Ir, Pt). The cap layer 25 may be further designed to terminate a composition of the magnetic free layer 24. To this end, the cap layer 25 may comprise at least one oxide layer (e.g., MgO, MgTiO, $MgAl_2O_3$) configured to enhance or control the crystallinity of the magnetic free layer 24.

The cap layer 25 can particularly be designed to perform a functional role of strain relaxation and/or crystal nucleation in the free layer 24, in order to enhance the crystallinity of the free layer 24. For instance, MgO may be used. A layer of $MgAl_2O_3$ can provide an improved lattice match between the cap layer 25 and the free layer 24. MgTiO may be used as a conductive equivalent to MgO. A magnetic oxide, like an iron oxide, could be added to the cap layer 25. As examples, the cap layer 25 may consist of an MgO layer or may consist of an Ir layer.

Figure 3:
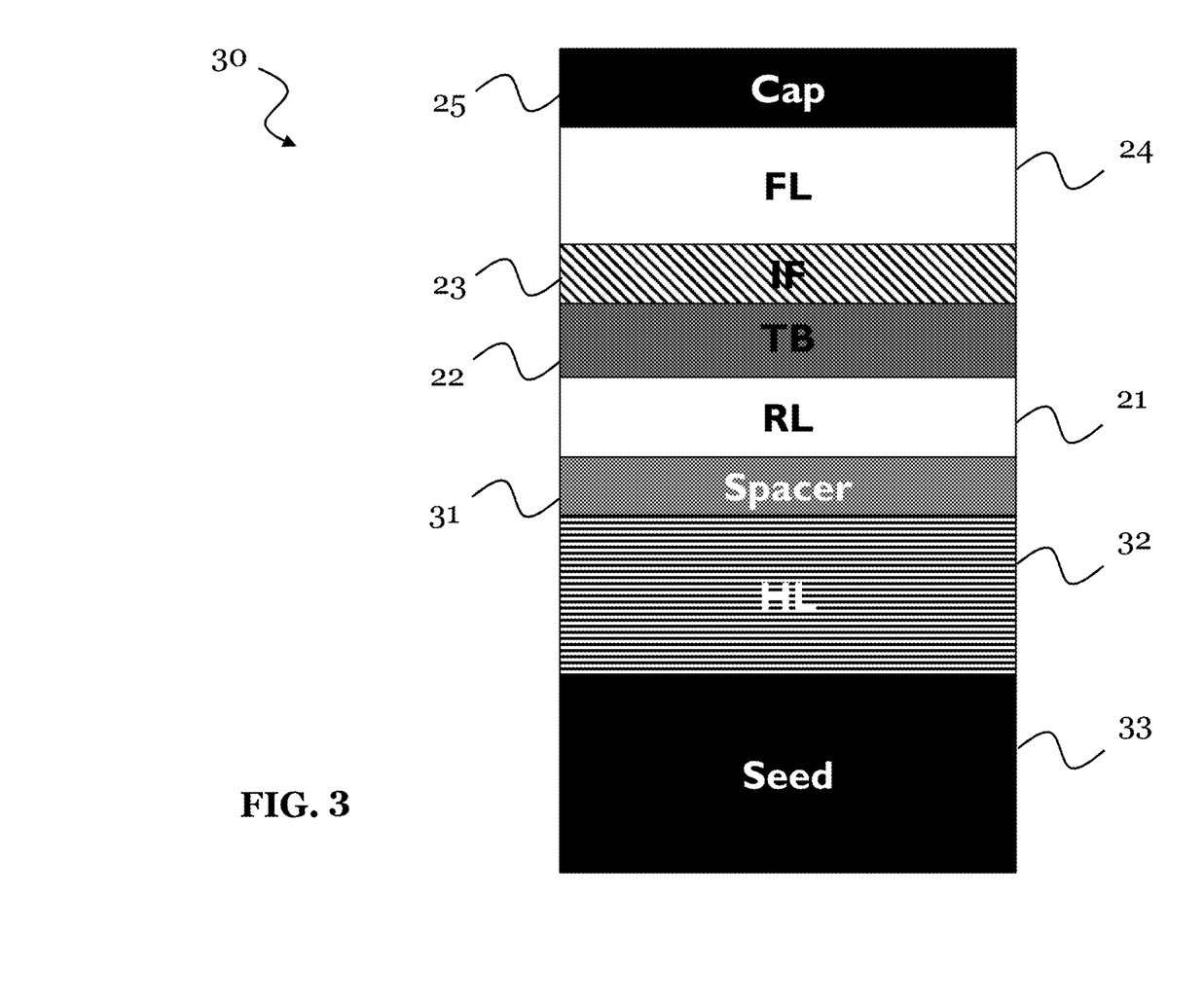
FIG. 3 shows a VCMA MRAM device, according to an example embodiment.
Figure 4:
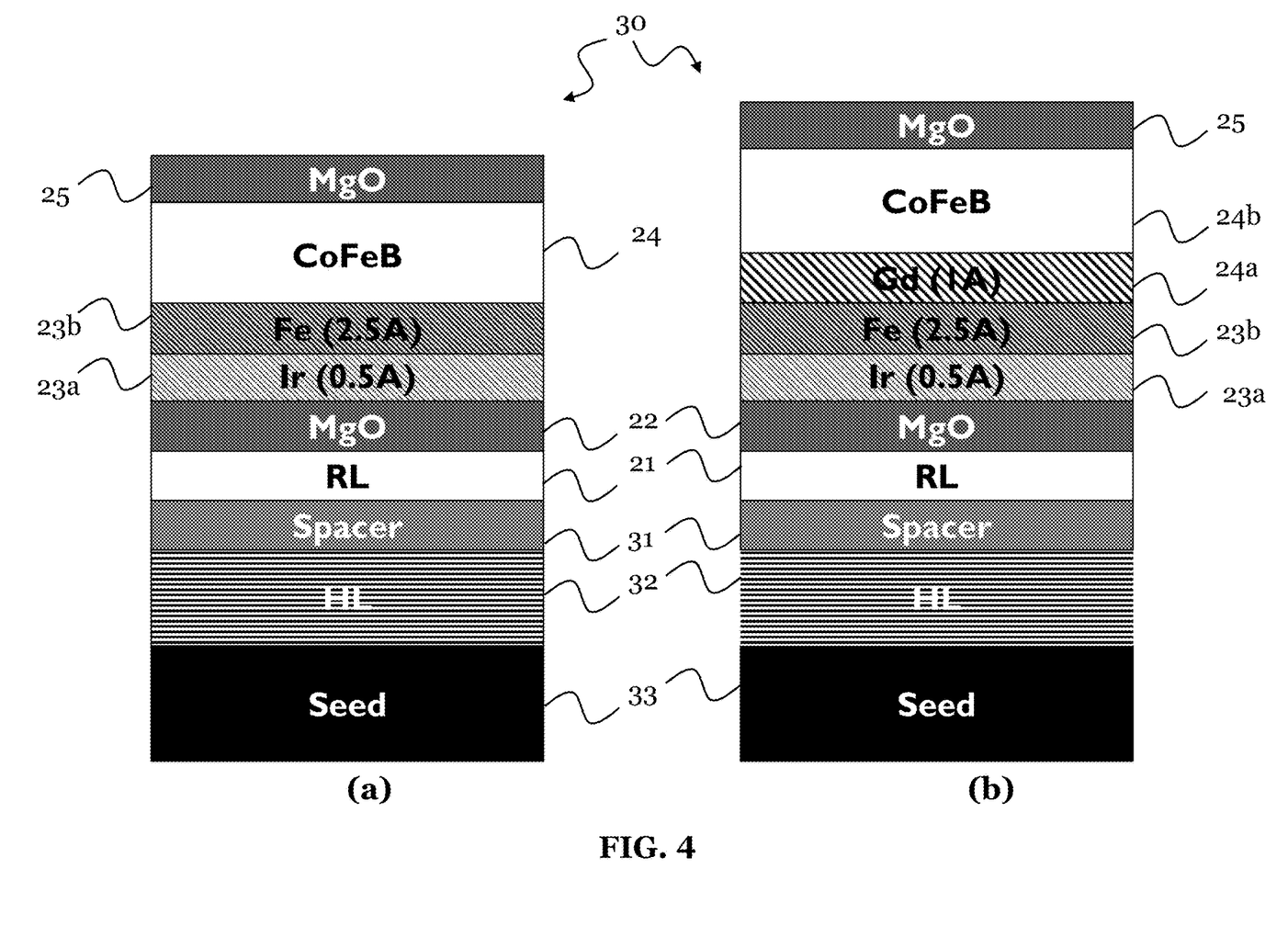
FIG. 4 shows examples of a VCMA MRAM device, according to example embodiments.
Figure 5:
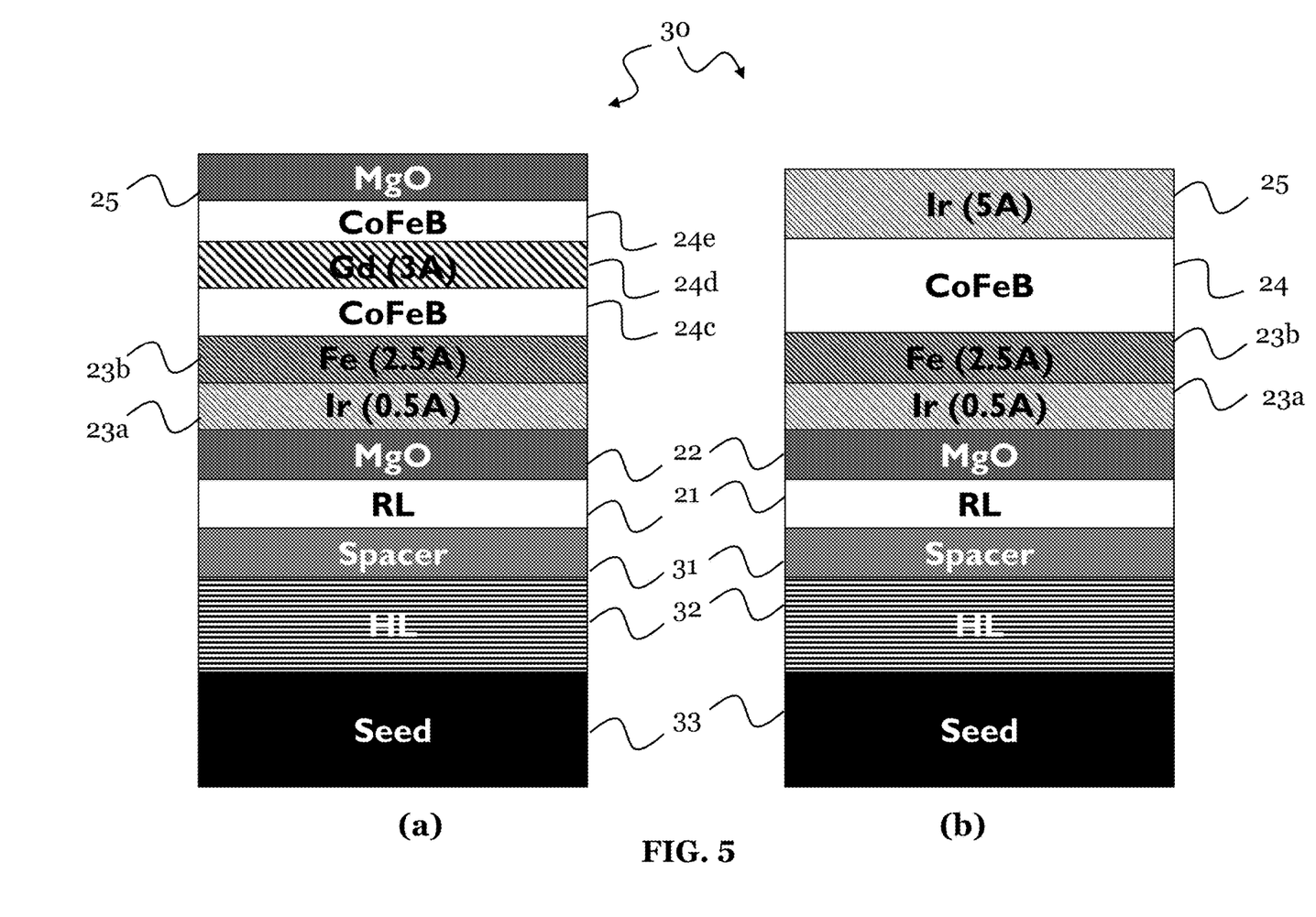
FIG. 5 shows examples of a VCMA MRAM device, according to example embodiments.

FIG. 3 shows an example of a VCMA MRAM device 30 according to an example embodiment. The VCMA MRAM device 30 includes the magnetic structure 20 shown in FIG. 2 and described in detail above. Similar elements in FIG. 2 and FIG. 3 are labelled with the same reference symbols, and may be implemented similarly.

In addition to the magnetic structure 20, the VCMA MRAM device 30 includes a spacer layer 31, a magnetic hard layer 32, and a seed layer 33. The spacer layer 31 is provided directly on the reference layer 21, on the opposite side of the tunnel barrier layer 22. The magnetic hard layer 32 is provided directly on the spacer layer 31, on the opposite side of the reference layer 21. The seed layer 33 is provided directly on the magnetic hard layer 32, on the opposite side of the spacer layer 31.

FIG. 4(a), FIG. 4(b), FIG. 5(a), and FIG. 5(b) show different VCMA MRAM devices 30 according to example embodiments. The shown embodiments are all non-limiting examples embodiments, and build on the embodiment shown in FIG. 3. Similar elements in the FIGS. 3, 4 and 5 are labelled with the same reference symbols, and may be implemented similarly.

In the exemplary VCMA MRAM device 30 shown in FIG. 4(a), the interface layer 23 consists of an Ir layer 23a provided directly on the tunnel barrier layer 22 (e.g., MgO), and a Fe layer 23b provided directly on the Ir layer 23a. The Fe layer 23b may have a thickness of about 2.5 Angstrom and the Ir layer 23a may have a thickness of about 0.5 Angstrom. The magnetic free layer 24 is provided on the Fe layer 23b, and is a CoFeB layer. The cap layer 25 may be an MgO layer.

In the exemplary VCMA MRAM device 30 shown in FIG. 4(b), the interface layer 23 consists of an Ir layer 23a provided directly on the tunnel barrier layer 22 (e.g., MgO), and a Fe layer 23b provided directly on the Ir layer 23a. The Fe layer 23b may have a thickness of about 2.5 Angstrom and the Ir layer 23a may have a thickness of about 0.5 Angstrom. The magnetic free layer 24 consists of a Gd layer 24a, which is provided directly on the Fe layer 23b of the interface layer 23, and a CoFeB layer 24b, which is provided directly on the Gd layer 24a. The cap layer 25 may be an MgO layer.

In the exemplary VCMA MRAM device 30 shown in FIG. 5(a), the interface layer 23 consists of an Ir layer 23a provided directly on the tunnel barrier layer 22 (e.g., MgO), and a Fe layer 23b provided directly on the Ir layer 23a. The Fe layer 23b may have a thickness of about 2.5 Angstrom and the iridium layer 23a may have a thickness of about 0.5 Angstrom. The magnetic free layer 24 consists of a CoFeB layer 24c provided directly on the Fe layer 23b of the interface layer 23, a Gd layer 24d provided directly on the CoFeB layer 24c, and another CoFeB layer 24e provided directly on the Gd layer 24d. The cap layer 25 may be an MgO layer.

In the exemplary VCMA MRAM device 30 shown in FIG. 5(b), the interface layer 23 consists of an Ir layer 23a provided directly on the tunnel barrier layer 22 (e.g., MgO), and a Fe layer 23b provided directly on the Ir layer 23a. The Fe layer 23b may have a thickness of about 2.5 Angstrom and the Ir layer 23a may have a thickness of about 0.5 Angstrom. The magnetic free layer 24 is provided on the Fe layer 23b, and is a CoFeB layer. The cap layer 25 is an Ir layer and may have a thickness of about 5 Angstrom.

Figure 6:
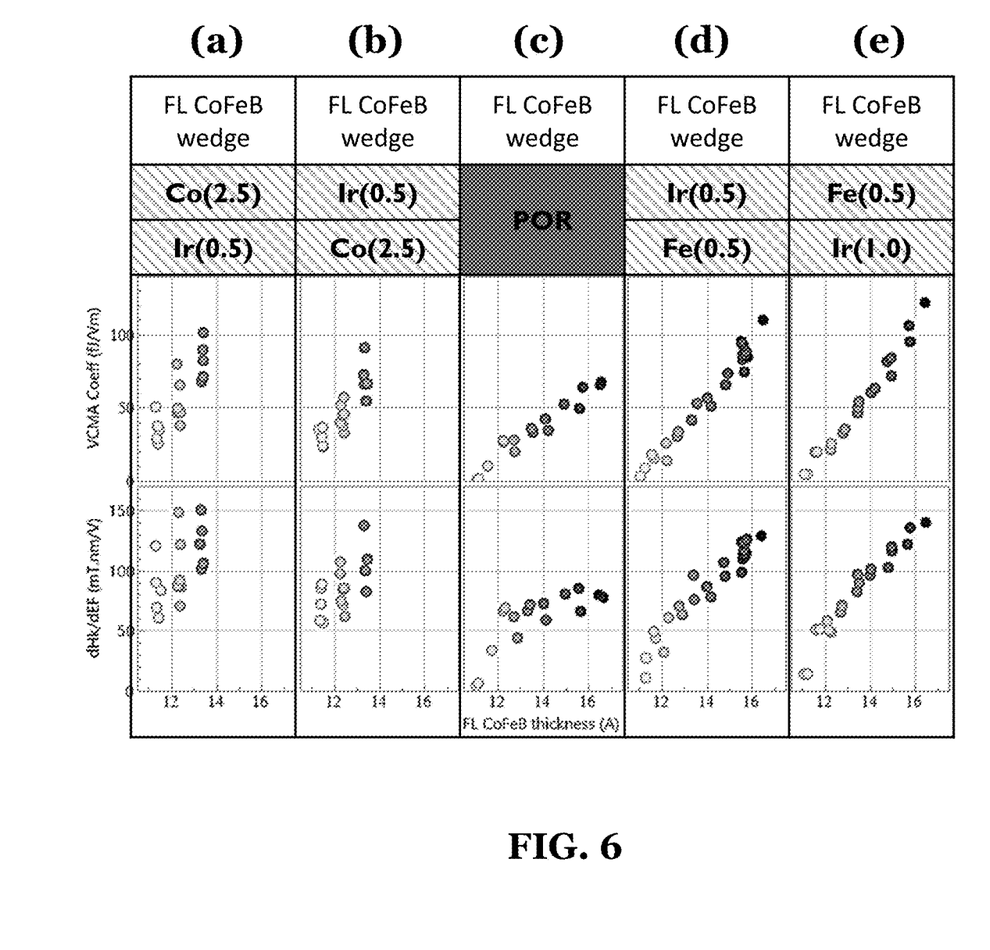
FIG. 6 compares VCMA coefficients for different exemplary magnetic structures having different interface layers, according to example embodiments.

FIG. 6 compares VCMA coefficients achieved for different magnetic structures 20 in (a), (b), (d), and (e) suitable for VCMA MRAM devices 30. The different magnetic structures 20 each include the magnetic free layer 24 (here a 30% CoFeB wedge is used), the interface layer 23 (a different kind is used for each magnetic structure 20), the tunnel barrier layer (here MgO is used), the reference layer 21 (here CoFeB is used), and the cap layer 25 (here MgO is used).

In particular, FIG. 6 compares the different magnetic structure 20 with a process of record (POR), i.e., a reference magnetic structure, in (c). In particular, the reference magnetic structure has a CoFeB reference layer, an MgO tunnel barrier layer on the reference layer, a CoFeB free layer on the MgO tunnel barrier layer, and a tantalum (Ta) cap layer.

The different magnetic structures 20 evaluated in FIG. 6 include the following interface layers 23: (a) an interface layer 23 consisting of a 0.5 Angstrom Ir layer on the tunnel barrier layer 22 and a 2.5 Angstrom Co layer provided on the Ir layer; (b) a 2.5 Angstrom Co layer on the tunnel barrier layer 22 and a 0.5 Angstrom Ir layer provided on the Co layer; (d) an interface layer 23 consisting of a 0.5 Angstrom Fe layer on the tunnel barrier layer 22 and a 0.5 Angstrom Ir layer provided on the Fe layer; and (e) an interface layer 23 consisting of a 1.0 Angstrom Ir layer on the tunnel barrier layer 22 and a 0.5 Angstrom Fe layer provided on the Ir layer.

For each of the interface layers 23, several data points are shown in FIG. 6. The data points are taken for different thicknesses of the CoFeB free layer 24, wherein this thickness is shown on the x-axis. The VCMA coefficients are shown on the y-axis (in fJ/Vm) in the upper part of the result table. In addition, also dHk/dEF is shown on the y-axis (in mT*nm/V) in the lower part of the result table. Thereby, Hk is the anisotropy field (or PMA filed) of the magnetic structure 20, and EF is the voltage-induced electric field that is applied to the magnetic structure 20 for switching the magnetic free layer 24. A high dHk/dEF structure can be used to create a large VCMA coefficient structure. The VCMA coefficient can, in particular, be calculated by (dHk/dEF)*(Ms*t), wherein Ms is the saturation magnetization and t is the thickness of the free layer 24. For example, dHk/dEF can be estimated from electrical analysis, and Ms*t can be estimated from material analysis.

For each interface layer 23 evaluated in FIG. 6, the VCMA coefficient of the magnetic structure 20—which is based on a full perpendicular magnetic tunnel junction (MTJ) structure—is larger than the VCMA coefficient of the POR at the same thickness of the free layer. For the "best" free layer thickness, the VCMA coefficients are in the order of 100 fJ/Vm, or are 100 fJ/Vm, or are even more than 100 fJ/Vm. In particular, for the Ir/Fe interface layer 23 and for the Fe/Ir interface layer 23, the VCMA coefficient reach the highest values well above 100 fJ/Vm.

In addition to the large VCMA coefficients, for each interface layer 23 evaluated in FIG. 6, the coercive field is clearly higher than the coercive field in the POR. This can, for example, be derived from the comparison of the voltage-induced anisotropy field change dHk/dEF of the magnetic structure 20 compared to the reference magnetic structure (POR).

Figure 7:
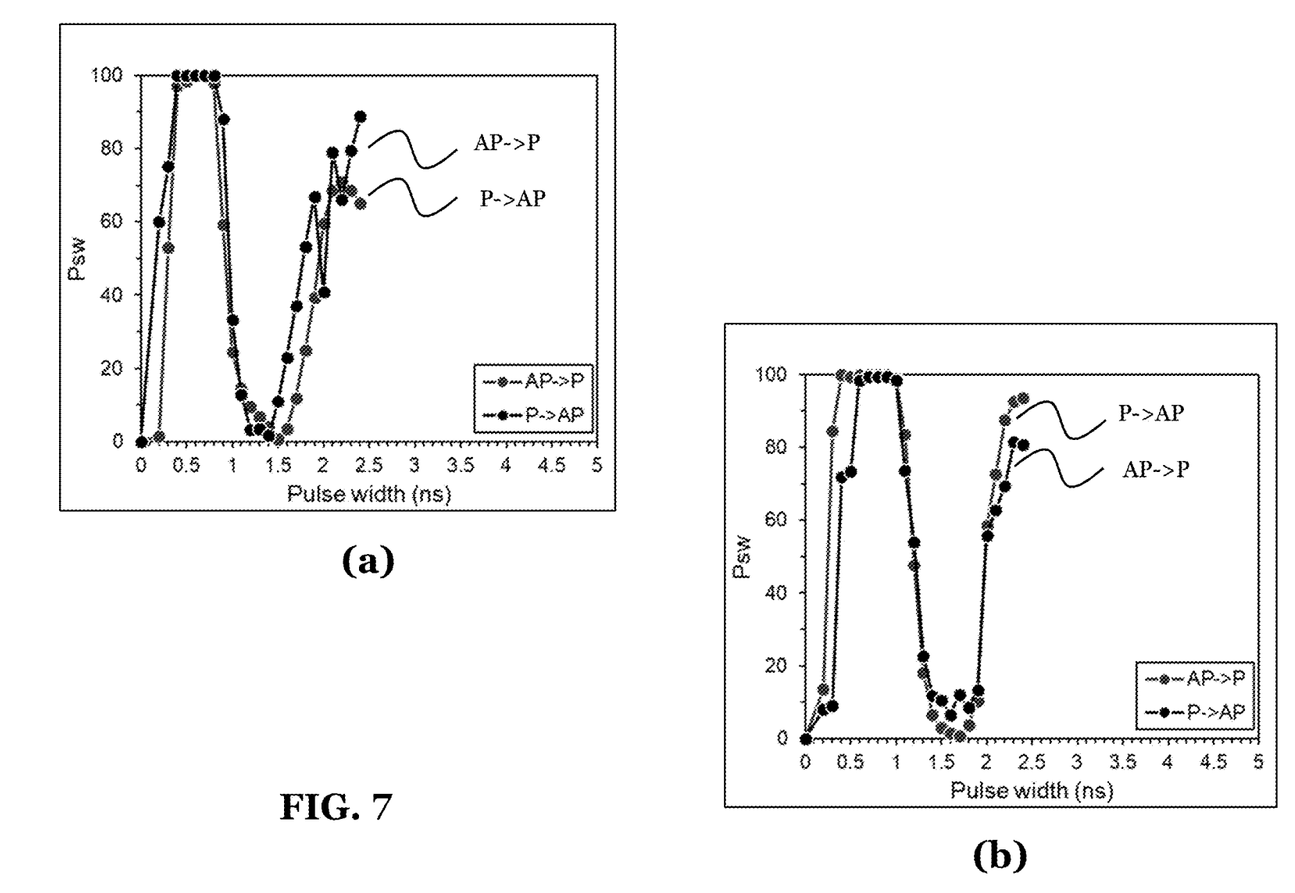
FIG. 7 shows a switching behavior of different magnetic structures having different interface layers, according to example embodiments.

Further, for each interface layer 23 evaluated in FIG. 6, an efficient VCMA induced magnetization switching can be observed, as exemplarily shown in FIG. 7 for two specific interface layers 23. In particular, FIG. 7 evaluates (a) an interface layer 23 consisting of a 0.5 Angstrom Ir layer on the tunnel barrier layer 22 and a 2.5 Angstrom Fe layer on the Ir layer; and (b) an interface layer 23 consisting of a 0.5 Angstrom Ir layer on the tunnel barrier layer 22 and a 2.5 Angstrom Co layer on the Ir layer (compare (a) in FIG. 6). It is clearly demonstrated that the switching of the magnetization of the magnetic free layer 24 from anti-parallel to parallel and from parallel to anti-parallel (compared to the magnetization of the reference layer 21) is well possible. Notably, for testing the magnetization switching, voltage pulses are applied to the magnetic structures 20, and at the same time a magnetic field is applied. The voltage-induced electric field (EF) that results from the amplitude of the applied voltage pulse is −1.33 V/m in both cases, and the applied magnetic field is 20 mT in (a) and 35 mT in (b). The applied voltage pulses have different pulse width between 0 ns and 2 ns (see the x-axis of FIG. 7(a) and FIG. 7(b)), and the corresponding switching probability (Psw in %) is shown (on the y-axis of FIG. 7(a) and FIG. 7(b)).

In summary, the embodiments provided in this disclosure enable increasing the VCMA coefficient of a magnetic structure 20 and a VCMA MRAM device, respectively, to 100 fJ/Vm or more. This increase is achieved by engineering the interface layer 23 and the cap layer 25 that sandwich the free layer 23. These improvements were obtained by selecting the material(s) and the thicknesses of these layers as described elsewhere herein. The engineered layers enhance the orbital occupancy and/or the spin-orbit-coupling of the free layer 24, and may further provide extra crystallinity to the magnetic free layer 24 and/or boost both the band offset and the Hc in the free layer 24.

It is to be understood that although example embodiments, specific constructions and configurations, as well as materials, have been discussed herein for devices according to the present disclosure, various changes or modifications in form and detail may be made without departing from the scope and technical teachings of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A magnetic structure for a voltage controlled magnetic anisotropy, VCMA, magnetic random access memory, MRAM, device, the magnetic structure comprising:
   a magnetic reference layer;
   a tunnel barrier layer provided directly on the magnetic reference layer;
   an interface layer provided directly on the tunnel barrier layer, wherein the interface layer consists of an iridium layer provided directly on the tunnel barrier layer and an iron layer provided directly on the iridium layer;
   a magnetic free layer provided directly on the interface layer; and
   a cap layer provided directly on the magnetic free layer;
   wherein the interface layer and the cap layer enhance an orbital occupancy and/or a spin-orbit-coupling of the magnetic free layer.

2. The magnetic structure of claim 1, wherein at least one of:
   the interface layer enhances a crystallinity of the magnetic free layer; or
   the cap layer terminates a composition of the magnetic free layer.

3. The magnetic structure of claim 2, wherein at least one of:
   the interface layer comprises at least one oxide layer configured to enhance the crystallinity of the magnetic free layer; or
   the interface layer comprises a dusting layer made of at least one material that is also included in the magnetic free layer and is configured to terminate the composition of the magnetic free layer.

4. The magnetic structure of claim 1, wherein at least one of:
   the cap layer comprises at least one 4f-metal layer and/or 5d-metal layer configured to control the orbital occupancy and/or the spin-orbit coupling of the magnetic free layer; or
   the interface layer comprises at least one 4f-metal layer and/or 5d-metal layer configured to enhance the orbital occupancy and/or the spin-orbit coupling of the magnetic free layer.

5. The magnetic structure of claim 1, wherein at least one of:
   the cap layer comprises at least one of an oxide layer or a metal layer;
   the oxide layer comprises at least one of magnesium oxide, magnesium aluminum oxide, or magnesium titanium oxide; or
   the metal layer comprises at least one of iridium, platinum, osmium, gadolinium, terbium, vanadium, scandium, or ytterbium.

6. The magnetic structure of claim 1, wherein the magnetic free layer is doped with a 4f-metal.

7. The magnetic structure of claim 1, wherein the magnetic free layer comprises iron-boron, and is doped with at least one of ytterbium, lanthanum, cerium, praseodymium, neodymium, promethium, samarium, europium, holmium, erbium, thulium, or lutetium.

8. The magnetic structure of claim 1, wherein at least one of:
   the interface layer has a thickness in a range of 0.1-3 Angstrom;
   the cap layer has a thickness in a range of 1-5 Angstrom; or
   the magnetic free layer has a thickness in a range of 5-20 Angstrom.

9. The magnetic structure of claim 1, wherein the iron layer has a thickness of about 2.5 Angstrom and the iridium layer has a thickness of about 0.5 Angstrom.

10. The magnetic structure of claim 1, wherein the magnetic free layer consists of one of the following:
    a cobalt-iron-boron layer provided directly on the interface layer;
    a gadolinium layer provided directly on the interface layer and a cobalt-iron-boron layer provided directly on the gadolinium layer; or
    a cobalt-iron-boron layer provided directly on the interface layer, a gadolinium layer provided directly on the cobalt-iron-boron layer, and another cobalt-iron-boron layer provided directly on the gadolinium layer.

11. The magnetic structure of claim 10, wherein the cobalt-iron-boron layer of the magnetic free layer is provided directly on the iron layer of the interface layer.

12. The magnetic structure of claim 1, wherein the magnetic free layer consists of a cobalt-iron-boron layer provided directly on the interface layer, a gadolinium layer provided directly on the cobalt-iron-boron layer, and another cobalt-iron-boron layer provided directly on the gadolinium layer.

13. The magnetic structure of claim 1, wherein the cap layer comprises at least one 4f-metal layer and/or 5d-metal layer configured to control the orbital occupancy and/or the spin-orbit coupling of the magnetic free layer.

14. A VCMA MRAM device comprising a magnetic structure, the magnetic structure comprising:
    a magnetic reference layer;
    a tunnel barrier layer provided directly on the magnetic reference layer;
    a spacer layer provided directly on the reference layer on the opposite side of the tunnel barrier layer;
    a magnetic hard layer provided directly on the spacer layer on the opposite side of the reference layer;
    a seed layer provided directly on the magnetic hard layer on the opposite side of the spacer layer;
    an interface layer provided directly on the tunnel barrier layer;
    a magnetic free layer provided directly on the interface layer; and
    a cap layer provided directly on the magnetic free layer;
    wherein the interface layer and the cap layer enhance an orbital occupancy and/or a spin-orbit-coupling of the magnetic free layer.

15. The VCMA MRAM device of claim 14, wherein at least one of:
    the interface layer has a thickness in a range of 0.1-3 Angstrom;

the cap layer has a thickness in a range of 1-5 Angstrom; or the magnetic free layer has a thickness in a range of 5-20 Angstrom.

16. The VCMA MRAM device of claim 14, wherein the interface layer consists of an iridium layer provided directly on the tunnel barrier layer and an iron layer provided directly on the iridium layer.

17. The VCMA MRAM device of claim 16, wherein the iron layer has a thickness of about 2.5 Angstrom and the iridium layer has a thickness of about 0.5 Angstrom.

18. The VCMA MRAM device of claim 14, wherein the magnetic free layer consists of one of the following:
- a cobalt-iron-boron layer provided directly on the interface layer;
- a gadolinium layer provided directly on the interface layer and a cobalt-iron-boron layer provided directly on the gadolinium layer; or
- a cobalt-iron-boron layer provided directly on the interface layer, a gadolinium layer provided directly on the cobalt-iron-boron layer, and another cobalt-iron-boron layer provided directly on the gadolinium layer.

19. The VCMA MRAM device of claim 18, wherein the interface layer consists of an iridium layer provided directly on the tunnel barrier layer and an iron layer provided directly on the iridium layer, wherein the cobalt-iron-boron layer of the magnetic free layer is provided directly on the iron layer of the interface layer.

\* \* \* \* \*